(12) United States Patent
Liu (10) Patent No.: US 12,510,105 B2
(45) Date of Patent: Dec. 30, 2025

(54) SPRAY FAN

(71) Applicant: Shenzhen Dingming Technology Limited, Guangdong (CN)

(72) Inventor: Bingde Liu, Guangdong (CN)

(73) Assignee: Shenzhen Dingming Technology Limited, Shenzhen (CN)

( * ) Notice: Subject to any disclaimer, the term of this patent is extended or adjusted under 35 U.S.C. 154(b) by 0 days.

(21) Appl. No.: 19/073,133

(22) Filed: Mar. 7, 2025

(65) Prior Publication Data

US 2025/0369453 A1 Dec. 4, 2025

Related U.S. Application Data

(63) Continuation-in-part of application No. 18/774,948, filed on Jul. 17, 2024, now Pat. No. 12,264,843.

(30) Foreign Application Priority Data

Jun. 3, 2024 (CN) .......................... 202421258850.7

(51) Int. Cl.
*B05B 17/06* (2006.01)
*F04D 29/70* (2006.01)

(52) U.S. Cl.
CPC ............ *F04D 29/705* (2013.01); *B05B 17/06* (2013.01)

(58) Field of Classification Search
CPC ............ B01F 23/21312; B01F 23/2133; B01F 23/215; B05B 17/06; F04D 29/705; F24F 6/14; F24F 6/16; F24F 11/89; F24F 2006/008
USPC ...... 261/28, 78.2, 84, 116, DIG. 3, DIG. 43; 292/285, DIG. 42
See application file for complete search history.

(56) References Cited

U.S. PATENT DOCUMENTS

| | | | | |
|---|---|---|---|---|
| 4,744,445 | A * | 5/1988 | Anderson | A45C 5/02 217/65 |
| 5,685,165 | A * | 11/1997 | Bigelow, Jr. | F24F 5/0017 62/457.2 |
| 6,364,380 | B2 * | 4/2002 | Franz | E05B 15/029 292/DIG. 45 |
| 6,401,483 | B1 * | 6/2002 | Kopp | F24F 5/0017 62/457.2 |
| 7,395,676 | B2 * | 7/2008 | White | F24F 1/0073 261/28 |
| 8,966,925 | B1 * | 3/2015 | DeClementi | F28D 5/00 62/331 |
| 8,979,073 | B2 * | 3/2015 | Lykins | F04D 25/084 261/78.2 |
| 8,985,557 | B2 * | 3/2015 | Canipe | F24F 6/12 261/78.2 |
| 9,267,698 | B2 * | 2/2016 | Stearns | F24F 7/007 |
| 12,264,843 | B1 * | 4/2025 | Liu | F24F 5/0035 |

(Continued)

*Primary Examiner* — Charles S Bushey (57) ABSTRACT

A spray fan includes a box, a mounting base and a fan body. The fan body is arranged on the mounting base so that the fan body has a first state arranged on the box and a second state contained in the box. The disassembly and assembly design of the spray fan enhances the convenience of storage and portability. The configuration of the spray assembly effectively prevents an excessive amount of liquid in the water storage tank, thereby avoiding issues of excessive internal pressure. Additionally, it prevents liquid from overflowing from the ultrasonic atomizer of the spray assembly, ensuring optimal atomization performance.

19 Claims, 12 Drawing Sheets

(56) References Cited

U.S. PATENT DOCUMENTS

| | | | |
|---|---|---|---|
| 2010/0043474 A1* | 2/2010 | Strussion | F24F 5/0035 |
| | | | 62/314 |
| 2012/0319309 A1* | 12/2012 | Sorola | F28C 3/08 |
| | | | 261/28 |
| 2015/0323205 A1* | 11/2015 | Escalettes | F04D 9/002 |
| | | | 261/78.2 |
| 2018/0149378 A1* | 5/2018 | Schock | F24F 7/007 |

* cited by examiner

SPRAY FAN

CROSS REFERENCE TO RELATED APPLICATIONS

The present application is a Continuation-In-Part application of U.S. application Ser. No. 18/774,948 filed on Jul. 17, 2024, which has now been granted with U.S. Pat. No. 12,264,843 on Apr. 1, 2025, which claims the benefit of Chinese Patent Application No. 202421258850.7 filed on Jun. 3, 2024. All the above are hereby incorporated by reference in their entirety.

TECHNICAL FIELD

The present disclosure relates to the technical field of electric fan, particularly to a spray fan.

BACKGROUND TECHNIQUE

The fan is a device that generates airflow driven by electricity. The blades configured inside the fan are energized to rotate and then turned into natural wind to achieve the effect of cooling. However, in hot summer, when the surrounding air temperature is higher, the wind temperature blown by the fan is also higher, so it cannot achieve more ideal cooling effect.

In view of this problem, the fans with spray function appear on the market. However, the existing spray fan needs to be configured with a box. To reduce the occupied space, the volume of the box needs to be small. So, it is necessary to frequently add water to the box when using. When the volume of the box is large, it is inconvenient to pack up and store.

SUMMARY

The embodiments of the present disclosure are provided to solve the technical problem of improving the convenience of storage of spray fan. The fan body of the spray fan disclosed by present application can be arranged on the box when using and be stored in the box.

The present disclosure discloses a spray fan, including a box, a mounting base and a fan body. The fan body can be arranged on the mounting base, the fan body is provided with a spray assembly, the spray assembly is located on an air outlet side of the fan body, the mounting base is also provided with a pumping component connected to the spray assembly to supply water to the spray assembly;

the pumping component includes a pump arranged in the mounting base, and a suction pipe and a drainpipe respectively connected to the pump;

the spray assembly includes a water storage bin arranged on the fan body, and at least one ultrasonic atomizer arranged on the water storage bin; the water storage bin is provided with a water inlet and an overflow port, the water inlet is connected to the drainpipe, and the overflow port is provided with an overflow pipe connected to a drainage hole of the mounting base; and the box and the mounting base are detachably arranged so that the fan body has a first state arranged on the box and a second state stored in the box.

Optionally, opposite sides of the mounting base can be respectively fastened with the box, the opposite sides of the box are provided with clamping assemblies, and the box and the mounting base can be clamped and limited through the clamping assemblies.

Optionally, the mounting base comprising a base and support arms arranged on the base, the fan body is rotationally connected to damping to the support arms, the mounting base is fastened with the box through the base.

Optionally, each clamping assembly comprising a rotating part, a connecting part and a holding part connected in sequence, the rotating part, the connecting part and the holding part form a U-shaped structure, the rotating part is rotationally connected to the box, the holding part is provided with a buckle, the buckle can be held with the base.

Optionally, the base comprising a first shell and a second shell connected to each other, the first shell includes a support panel and a flange arranged on an edge of the support panel, a T-shaped structure is formed between the flange and the support panel, and the buckle can be inserted into the flange, the second shell and each support arm are respectively connected to the support panel, and the second shell is located on a side of the support panel deviating from the support arm.

Optionally, the pump is arranged in the base, the first shell and/or the second shell are provided with a wiring via hole, so that the suction pipe inserts into the box through the wiring via hole, the drainpipe is connected to the spray assembly.

Optionally, the support arm comprising a first vertical plate arranged on the first shell and a second vertical plate connected to the first vertical plate, between which a wiring channel is formed, so that the drainpipe is connected to the spray assembly along the wiring channel of one of the support arms.

Optionally, the base is also provided with a battery, the pump, the spray assembly and the fan body are electrically connected to the battery, the base is further provided with a control switch, the control switch is electrically connected to the pump, the fan body, the spray assembly and the battery through a circuit board respectively, and is used to control start and stop of the pump and the fan body, wherein the spray assembly and the pump are connected in series.

Optionally, the water storage bin is provided with an absorbent cotton corresponding to the ultrasonic atomizer.

Optionally, a lower end of the water storage bin is provided with a water inlet, and an upper end of the water storage bin is provided with an overflow port.

Optionally, a lower end of the water storage bin is provided with a water inlet, an upper end of the water storage bin is provided with an overflow port, and the overflow pipe is connected to a drain hole on the second shell through the support arm.

Optionally, a handle is rotationally arranged on the second shell, a containing slot is arranged on the second shell, and the handle can be accommodated in the containing slot.

Optionally, a handle is rotationally arranged on a bottom of the mounting base, a containing slot is arranged on the second shell, and the handle can be accommodated in the containing slot.

Optionally, a handle is rotationally arranged on a bottom of the mounting base.

Optionally, the fan is stored in an inverted position inside the box in the second state.

Optionally, the fan is stored in a lowered position inside the box in the second state.

Optionally, the mounting base includes a water guide channel arranged below the spray assembly, and a water guide hole provided on the mounting base and communicating with the water guide channel.

Optionally, the overflow pipe is arranged to extend inclined upward.

Optionally, wherein a water inlet is provided on one side of the water storage bin, and an overflow port is provided on an other side of the water storage bin.

Comparing with the prior art, the spray fan provided by the embodiment of the present disclosure has the beneficial effect of ensuring that the spray fan can be connected to the box through the mounting base in both the first state and the second state. In the first state, the fan body is set on the box. Under the cooperation of the pumping component and the spray component, the water in the box is supplied to the spray component so that the spray component can produce water mist stably. The wind blown by the fan body is thus mixed with fog droplets. As the droplets vaporize, they absorb heat from nearby areas to make the blowing wind cooler. In the second state, the fan body can be put into the box the convenience of storage is improved. This avoids damage to the water storage bin or the pump caused by an excessive amount of liquid in the water storage bin, and avoids excessive internal pressure in the water storage bin due to an overflow of liquid, which may cause liquid to overflow from the ultrasonic atomizer of the spray assembly, resulting in failure to atomize properly.

BRIEF DESCRIPTION OF THE DRAWINGS

The technical solution of the present invention will be described in detail in combination with the attached drawings and the following embodiments. Reference is now made to the attached drawings.

FIG. 1 is a structural diagram of the use state of the spray fan provided by the embodiment of the present disclosure;

FIG. 2 is a structural diagram of the storage state of the spray fan provided by the embodiment of the present disclosure;

FIG. 3 is a structural diagram of the combination of the pumping component and the spray assembly provided by the embodiment of the present disclosure;

FIG. 4 is another structural diagram of the use state of the spray fan provided by the embodiment of the present disclosure;

FIG. 5 is a structural diagram of the clamping assembly provided by the embodiment of the present disclosure;

FIG. 6 is a structural diagram of the spray assembly provided by the embodiment of the present disclosure.

FIG. 7 is a structural diagram of the inclined arrangement of the overflow pipe provided by the embodiment of the present disclosure.

FIG. 8 is a structural diagram of the water guide channel and water guide hole provided by the embodiment of the present disclosure.

FIG. 9 is a structural diagram of FIG. 8 with the first shell hidden.

FIG. 10 is a first structural diagram of the water storage bin provided by the embodiment of the present disclosure.

FIG. 11 is a second structural diagram of the water storage bin provided by the embodiment of the present disclosure.

FIG. 12 is a structural diagram of the lowered configuration of the second state of the spray fan provided by the embodiment of the present disclosure.

FIG. 13 is a structural diagram of the box and the first limiting structure provided by the embodiment of the present disclosure.

FIG. 14 is a structural diagram of the mounting base and the second limiting structure provided by the embodiment of the present disclosure.

FIG. 15 is a structural diagram of the box and the fixing structure in the first state provided by the embodiment of the present disclosure.

FIG. 16 is a structural diagram of the box and the fixing structure in the second state provided by the embodiment of the present disclosure.

Like reference numerals refer to like parts throughout the several views, and in which: 100, spray fan; 110, box; 112, clamping assembly; 1122, rotating part; 1124, connecting part; 1126, holding part; 1128, buckle; 1128*a*, guide bevel; 114, transparent display strip; 120, mounting base; 122, base; 1222, first shell; 1222*a*, support panel; 1222*b*, flange; 1224, second shell; 1224*a*, drain hole; 1224*b*, storage tank; 124, support arm; 1242, first vertical plate; 1244, second vertical plate; 126, wiring via hole; 130, fan body; 140, spray assembly; 142, water storage bin; 1422, water inlet; 1424, overflow port; 144, ultrasonic atomizer; 146, overflow pipe; 150, pumping component; 152, pump; 154, suction pipe; 156, drainpipe; 160, battery; 170, control switch; 172, circuit board; 180, handle.

DESCRIPTION OF THE EMBODIMENT

It should be noted that the embodiments in current application and the features in the embodiments may be combined with each other, if there is no conflict. Preferred embodiments of the present disclosure are described in detail in conjunction with the attached drawings.

As shown in FIG. 1 to FIG. 4, the embodiment of the present disclosure provides a spray fan 100, which comprises a box 110, a mounting base 120 and a fan body 130. The fan body 130 can be arranged on the mounting base 120, the fan body 130 is provided with a spray assembly 140, and the spray assembly 140 is located on the air outlet side of the fan body 130. The mounting base 120 is also provided with a pumping component 150 connected to the spray assembly 140 for supplying water to the spray assembly 140, and the opposite sides of the mounting base 120 can be connected to the box 110 respectively so that the fan body 130 has a first state arranged on the box 110 and a second state accommodated in the box 110.

Particularly, the fan body 130 is arranged on the mounting base 120 through the mounting base 120 buckle, so that the fan body 130 can form a stable connection with the box 110 through the mounting base 120. When in the first state, the box 110 is filled with water to be used by the spray assembly 140, and the box 110 is acting as the base of the spray fan 100 to avoid the problem of lateral sway or toppling during use. When in the second state, the fan body 130 is accommodated in the box 110, the box 110 is acting as the storage box of the spray fan 100. This is conducive to reducing the space occupied during storage.

In addition, a pumping component 150 connected to the spray assembly 140 is arranged in the mounting base 120 for pumping the water loaded in the box 110 to the spray assembly 140 so that the spray assembly 140 can spray the water mist stably. Because the spray assembly 140 is on the air outlet side of the fan body 130, the water mist emitted by the spray assembly 140 is blown forward by the wind and will not fall into the fan body 130. This is conducive to ensuring the stability of the operation of the fan body 130.

The spray fan 100 provided by the embodiment of the present application is to ensure that the spray fan 100 can be connected to the box 110 through the mounting base 120 in both the first state and the second state. It is necessary to make the opposite sides of the mounting base 120 can be clamped to the box 110 respectively. So, in the first state, the fan body 130 is arranged on the box 110. Under the cooperation of the pumping component 150 and the spray assembly 140, the water in the box 110 is supplied to the spray assembly 140 so that the spray assembly 140 can produce water mist stably. Under the wind of the fan body 130, the blown wind is mixed with fog droplets, which absorb the heat nearby during the vaporization process to make the blown wind cooler. In the second state, just put the fan body 130 upside down so that the other side of the mounting base 120 is clamped with the box 110 and the fan body 130 can be put into the box 110. By using the above technical solutions, the fan body can be set on the box when in use and be inverted and stored in the box when storing. So that the convenience of storage is improved.

Certainly, referring to FIGS. 12 to 16, the second state may also correspond to another storage method. In the second state, the fan body 130 is lowered and stored inside the box 110. A first limiting structure 113 is provided in the top area of the box 110. When the mounting base 120 is placed in the normal orientation, the second limiting structure 123 of the mounting base 120 abuts against the first limiting structure 113 of the box 110, thereby fixing the mounting base 120 to the top of the box 110 to define the first state. When the mounting base 120 is reversely placed on the top of the box 110, the first limiting structure 113 and the second limiting structure 123 are offset from each other, thereby allowing the mounting base 120 and the fan body 130 to lower into the box 110, defining the second state for storage.

Figure 15:
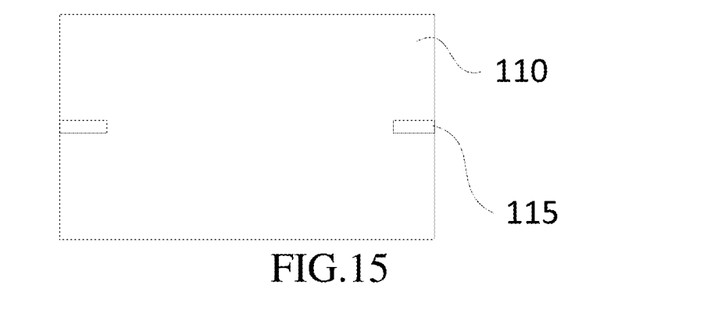
Figure 16:
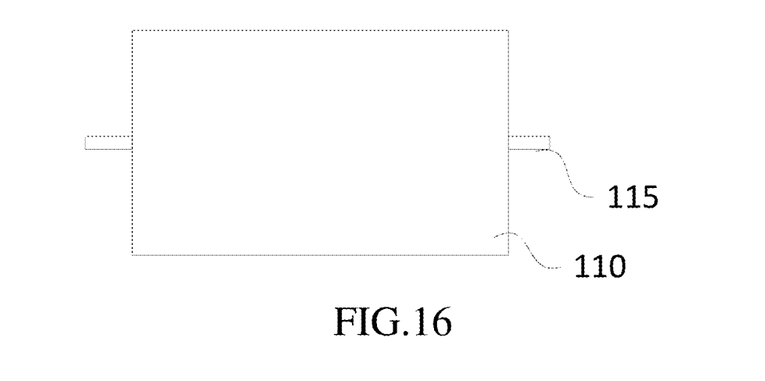

In addition to the cooperation between the first limiting structure 113 and the second limiting structure 123, other solutions may also be adopted. For example, a movable fixing structure 115 may be used. The fixing structure 115 can protrude inward from the top area of the box 110 through extension and retraction, movement, or rotation, thereby forming an inwardly protruding structure to fix the mounting base 120. Of course, the fixing structure 115 can also be retracted, thereby lowering the mounting base 120 unobstructed into the box 110 for storage. Referring to FIGS. 15 and 16, the fixing structure 115 can extend into the box 110 to form a limiting protrusion or be retracted as needed.

Figure 1:
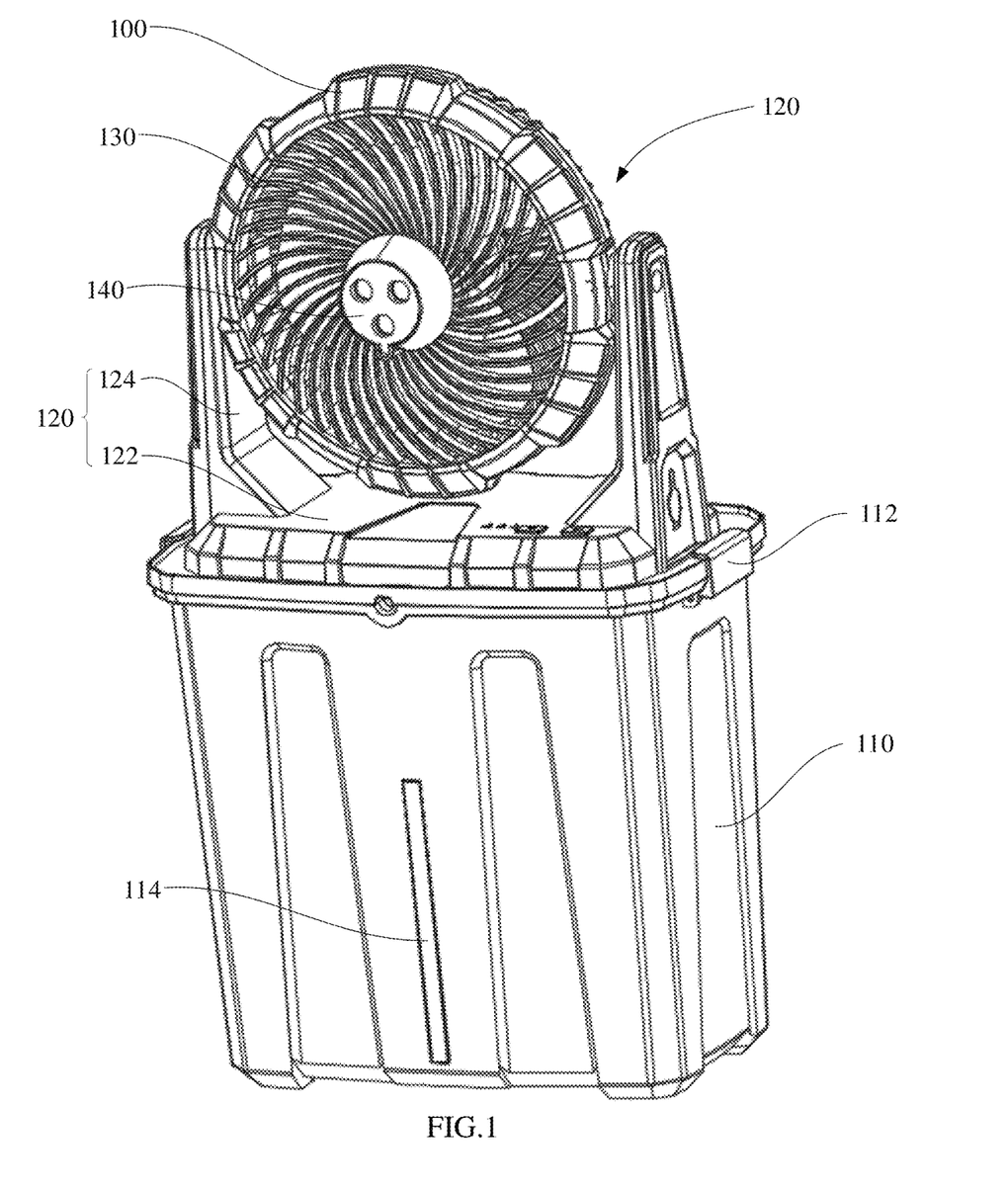
Figure 2:
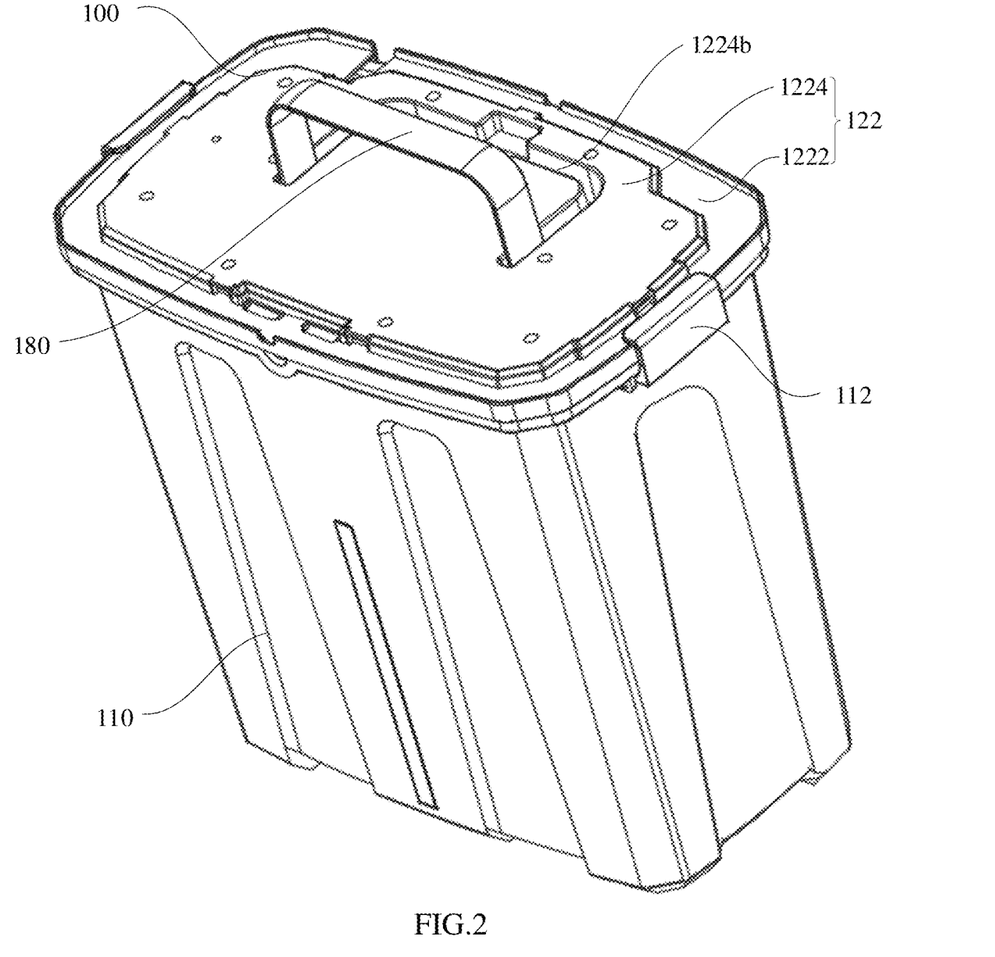

As shown in FIGS. 1 and 2, clamping assemblies 112 is arranged on opposite sides of the box 110. The box 110 and the mounting base 120 can be clamped and limited through the clamping assembly 112.

Specifically, by providing the clamping assemblies 112 on opposite sides of the box 110, when the fan body 130 is connected to the box 110 through the mounting base 120, the mounting base 120 can be clamped to the edge of the box 110. The clamping assemblies 112 can clamp and limit the mounting base 120 and the box 110 to ensure a stable connection between them.

As shown in FIG. 1, the mounting base 120 comprises a base 122 and a support arm 124 arranged on the base 122. The fan body 130 is rotationally connected to the support arm 124, with a damping effect, the mounting base 120 is clamped with the box 110 through the base 122.

Specifically, two support arms 124 are arranged on the base 122 so that the opposite sides of the fan body 130 are connected to the support arm 124 to ensure the stability of the fan body 130 when used. After the base 122 is connected to the box 110, the support arm 124 can raise the fan body 130 on the mounting base 120 to a certain height, which helps to reduce the risk of the wind blown by the fan body 130 being blocked. In addition, the rotation connection, with a damping effect, between the fan body 130 and the support arm 124 is conducive to make the fan body 130 deflect the preset angle relative to the support arm 124, so that to properly adjust the direction of the fan body 130 to improve the applicability during use.

Figure 5:
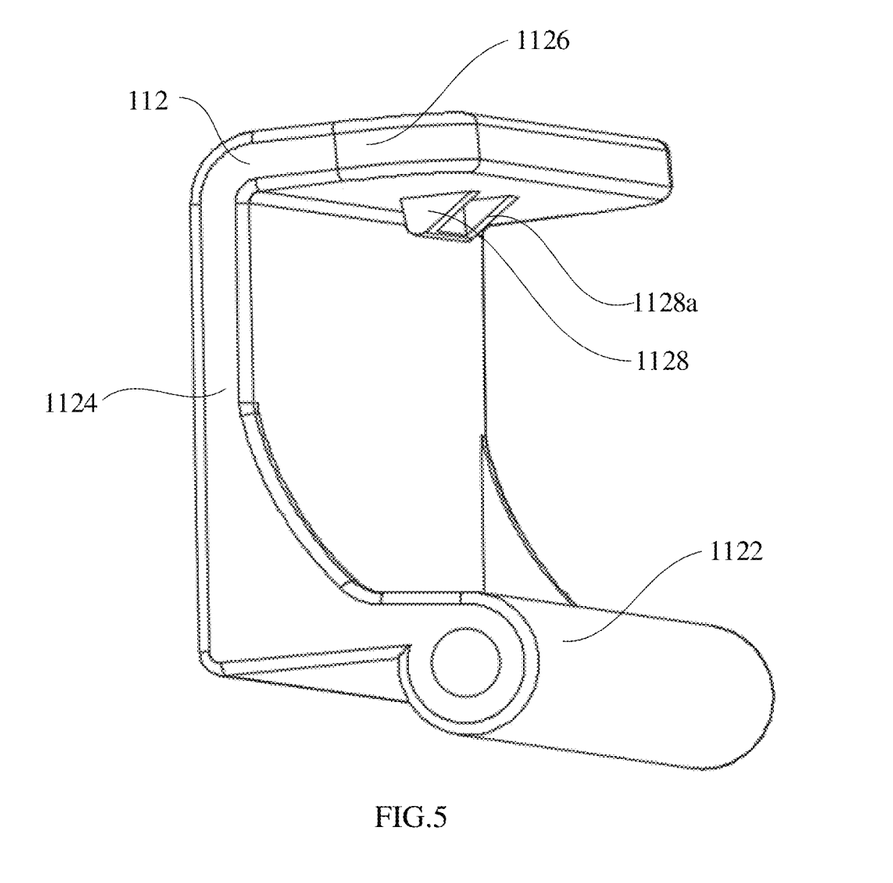

As shown in FIG. 1, FIG. 2 and FIG. 5, the clamping assembly 112 comprises a rotating part 1122, a connecting part 1124 and a holding part 1126 connected in sequence. A U-shaped structure is formed between the rotating part 1122, the connecting part 1124 and the holding part 1126. The buckle 1128 can be clamped with the base 122.

Particularly, by arranging the clamping assembly 112 as the structural form of the rotating part 1122, the connecting part 1124 and the holding part 1126 connected in sequence and forming a U-shaped structure between the rotating part 1122, the connecting part 1124 and the holding part 1126, the clamping assembly 112 is rotatably connected to the box 110 through the rotating part 1122. When the rotating part 1122 is rotated to the angle at which the clamping assembly 112 is at the natural drooping state, the base 122 and the box 110 can be separated at any time to facilitate the adjustment of the attitude between the fan body 130 and the box 110 and to avoid the loss of the clamping assembly 112. When the base 122 and the box 110 need to be clamped and fixed again after the attitude adjustment between them is completed, the clamping connection can be realized by directly rotating the clamping assembly 112. The whole process is simple and convenient. By setting the buckle 1128 on the holding part 1126, the stability of the clamping can be guaranteed to avoid accidental release. Among them, the guide bevel 1128a can be set on the buckle 1128, which is conducive to reducing the resistance and reducing the difficulty of matching when pushing the holding part 1126 to the base 122. When it is necessary to release the clamping connection, it is necessary to apply force to the holding part 1126 to make the clamping assembly 112 produce elastic deformation away from the base 122, so that the buckle 1128 is released from the base 122 and the clamping connection can be released smoothly.

Figure 4:
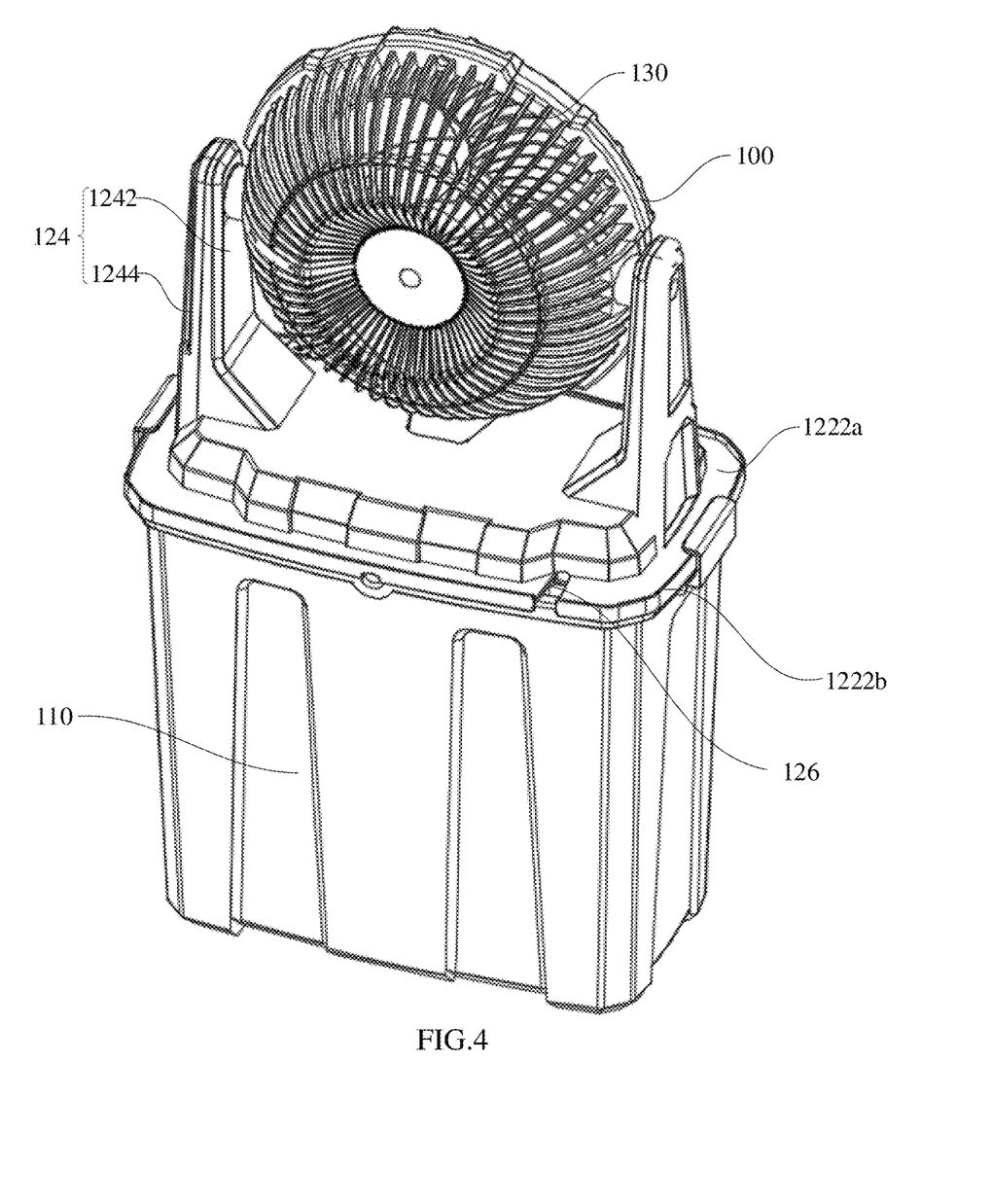

As shown in FIG. 2 and FIG. 4, the base 122 comprises a first shell 1222 and a second shell 1224 connected to each other. The first shell 1222 comprises a support panel 1222a and a flange 1222b arranged on the edge of the support panel 1222a. A T-shaped structure is formed between the flange 1222b and the support panel 1222a. The buckle 1128 can be clamped into the flange 1222b. The second shell 1224 and the support arm 124 are connected to the support panel 1222a respectively, and the second shell 1224 is located on the side of the support panel 1222a away from the support arm 124.

Providing the first shell 1222 and the second shell 1224 connected to each other to the base 122 is conducive to set the base 122 as a hollow structure. This facilitates other components to be arranged in the base 122 and improves the utilization of space on the premise of ensuring the strength of base 122 itself. In addition, the first shell 1222 includes a support panel 1222a and a flange 1222b arranged on the edge of the support panel 1222a. The flange 1222b can be matched with the clamping assembly 112 and the box 110. The flange 1222b can further improve its own structural strength to avoid the force tearing at the edge of the first shell 1222. A T-shaped structure is formed between the flange 1222b and the support panel 1222a, so that the opposite sides of the support panel 1222a can be matched with the box 110 to play the required connection role.

Figure 3:
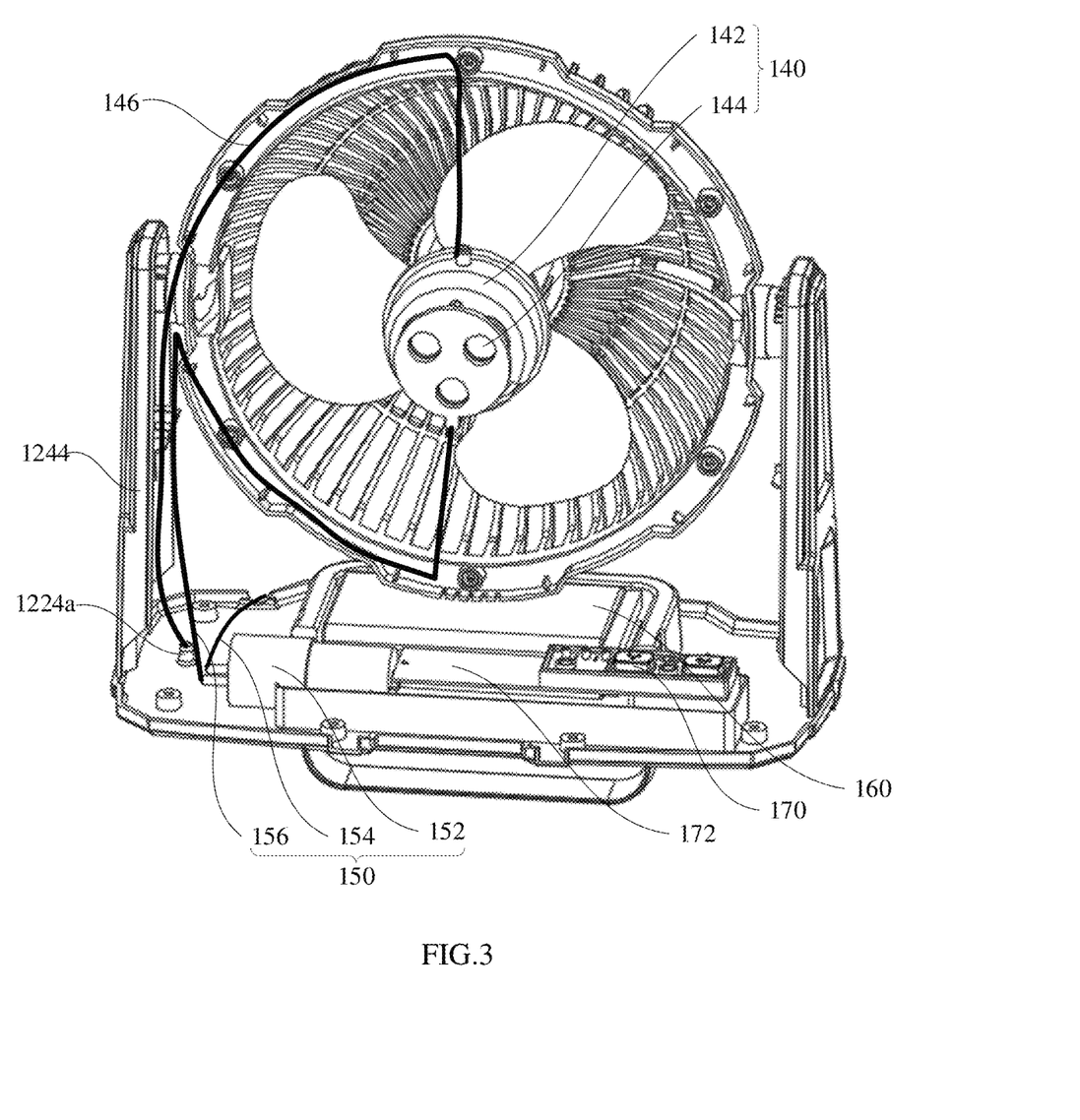

As shown in FIGS. 3 and 4, the pumping component 150 comprises a pump 152 arranged in the base 122, a suction pipe 154 and a drainpipe 156 respectively connected to the pump 152. The first shell 1222 and/or the second shell 1224 are provided with a wiring via hole 126 so that the suction pipe 154 can be extended into the box 110 through the wiring via hole 126. The drainpipe 156 is connected to the spray assembly 140.

Particularly, a pump 152 is provided in the base 122 to serve as a power for supplying water to spray assembly 140. By connecting the suction pipe 154 and the drainpipe 156 to the pump 152, the suction pipe 154 needs to be extended into the box 110 to extract the water in the box 110, and the drainpipe 156 is connected to the spray assembly 140 for supplying water to the spray assembly 140. Since the pump 152 is arranged in the base 122, it is necessary to set the wiring via hole 126 on the base 122. In practical application, the wiring via hole 126 can be set on the first shell 1222 and/or the second shell 1224. That is, the wiring via hole 126 can be set on the first shell 1222, the wiring via hole 126 can also be set on the second shell 1224, and the wiring via hole 126 can be set on the first shell 1222 and the second shell. It is understandable that in the process of use, to observe the volume of the water in the box 110 so that to facilitate the actual water refill in time, a transparent display strip 114 can be set on at least one side of the box 110 to observe the volume of the water in the box.

As shown in FIG. 3 and FIG. 4, the support arm 124 comprises a first vertical plate 1242 arranged on the first shell 1222 and a second vertical plate 1244 connected to the first vertical plate 1242, between which a wire channel is formed. The drainpipe 156 is connected to the spray assembly 140 along the wiring channel of one of the support arms 124.

Particularly, the first vertical plate 1242 and the first shell 1222 can be set in one piece, which is conducive to reducing production costs and improving the reliability of the connection. The support arm 124 can also be set as a hollow structure, which is convenient to wiring the power line or the drainpipe 156. This arrangement avoids being exposed directly to the outside and easily affected by the external environment so that to ensure the reliability of use. Through the wiring channel formed between the first vertical plate 1242 and the second vertical plate 1244, the second vertical plate 1244 can be removed from the first vertical plate 1242 during the wiring, and then the second vertical plate 1244 and the first vertical plate 1242 can be connected after the wiring is completed, which is conducive to reducing the difficulty of operation and improving the assembly efficiency.

As shown in FIG. 3, the base 122 is also provided with a battery 160. The pump 152, the spray assembly 140 and the fan body 130 are electrically connected to the battery 160 respectively. The base 122 is further provided with a control switch 170. The control switch 170 is electrically connected to the pump 152, the fan body 130, the spray assembly 140 and the battery 160 through the circuit board 172 respectively and is used to control the start and stop of the pump 152 and the fan body 130, wherein the spray assembly 140 and the pump 152 are connected in series.

Particularly, the battery 160 can provide the required electrical energy for the pump 152, the spray assembly 140 and the fan body 130 to ensure the use in conjunction with each other. By arranging the control switch 170 on the base 122, the control switch 170 is electrically connected to the pump 152, the fan body 130, the spray assembly 140 and the battery 160 through the circuit board 172 respectively to control the start and stop of the pump 152 and the fan body 130. It is understood that the spray assembly 140 and the pump 152 are connected in series. The spray assembly 140 and the pumping component 150 can be synchronized to ensure the normal operation of the spray. The fan body 130 can also be operated separately, and the spray assembly 140 and the pumping component 150 can be controlled to stop the operation when the spray is not needed.

Figure 6:
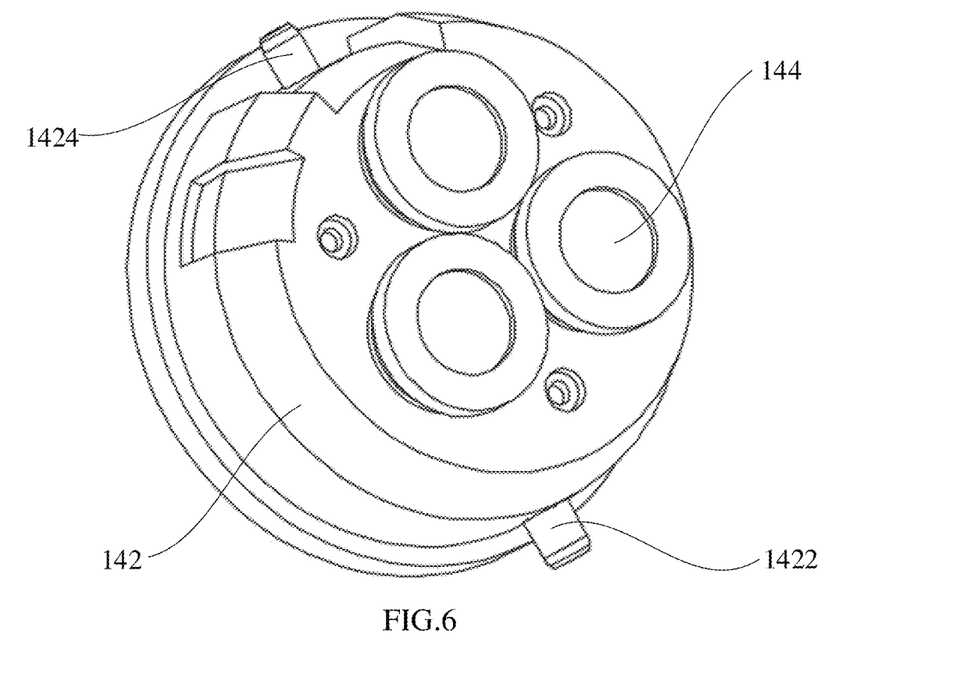

As shown in FIGS. 3 and 6, the spray assembly 140 comprises a water storage bin 142 arranged on the fan body 130, at least one ultrasonic atomizer 144 arranged on the water storage bin 142. The water storage bin 142 is connected to the drainpipe 156. The water storage bin 142 is provided with an absorbent cotton corresponding to the ultrasonic atomizer 144.

Particularly, the water storage bin 142 is used to temporarily store the water injected by the drainpipe 156 for the use of the ultrasonic atomizer 144. The ultrasonic atomizer 144 uses electronic high-frequency oscillation to disperse the molecular structure of liquid water through the high-frequency resonance of the atomizing plate to produce a natural and flowing water mist. The water mist of the atomizing plate is relatively fine, and the human body is more comfortable. The aperture of the atomizing plate is generally about 3 μm-20 μm, and different specifications can be selected according to actual needs. In addition, the water storage bin 142 is provided with absorbent cotton corresponding to the ultrasonic atomizer 144, which is conducive to increase the contact area with water under an elevation angle condition and avoid affecting the atomization effect. It should be understood that the number of the ultrasonic atomizer 144 can be set to 1, 2 or 3 according to actual needs.

As shown in FIG. 3, the lower end of the water storage bin 142 is provided with a water inlet 1422, the upper end of the water storage bin 142 is also provided with an overflow port 1424. The water inlet 1422 is connected to the drainpipe 156. An overflow pipe 146 is provided on the overflow port 1424, and the overflow pipe 146 is connected to the drainage hole 1224a on the second shell 1224 through the support arm 124.

Particularly, in the process of use, the drainpipe 156 through the water inlet 1422 to water storage bin 142, so that the storage bin 142 to achieve water storage for the use of ultrasonic atomizer 144. When the water in the storage bin 142 is too much, the excess water can be spilled out through the overflow port 1424. The overflow pipe 146 is provided on the overflow port 1424. The overflow pipe 146 is connected to the drainage hole 1224a on the second shell 1224 through the support arm 124, which finally allows the overflow water to flow into the box 110 to avoid water waste. Meanwhile, this avoids damage to the water storage bin 142 or the pump 152 caused by an excessive amount of liquid in the water storage bin 142, and avoids excessive internal pressure in the water storage bin 142 due to an overflow of liquid, which may cause liquid to overflow from the ultrasonic atomizer 144 of the spray assembly 140, resulting in failure to atomize properly.

Figure 7:
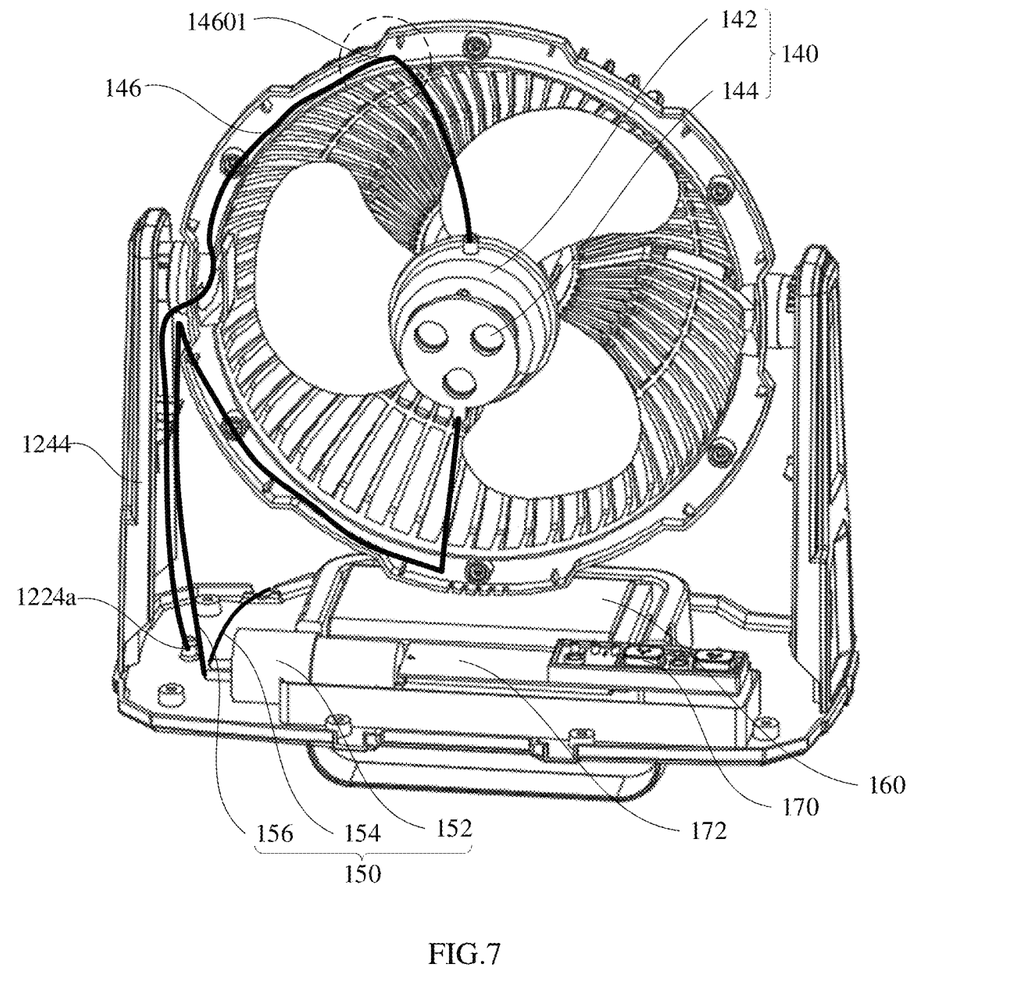

Furthermore, referring to FIG. 7, the overflow pipe 146 is arranged to extend inclined upward. The primary purpose of this inclined arrangement is to form a larger angle bend at the inlet 14601 of the wiring channel of the overflow pipe 146. On one hand, this avoids excessive bending of the overflow pipe 146, which could lead to damage, and on the other hand, excessive bending of the overflow pipe 146 may cause poor drainage flow.

In this embodiment, the water storage bin 142 may also be provided with an alternative configuration. A water inlet 1422 is provided on one side of the water storage bin 142, and an overflow port 1424 is provided on the other side. Preferably, the water inlet 1422 and the overflow port 1424 are arranged on the left and right sides, respectively. Compared to the aforementioned configuration where the water inlet and overflow port are arranged at the upper and lower ends, the left and right arrangement ensures a more stable water flow within the water storage bin 142, avoiding violent impact in the vertical direction and reducing liquid splashing and fluctuations.

As shown in FIG. 2, a handle 180 is rotationally arranged on the second shell 1224, and a containing slot 1224*b* is arranged on the second shell 1224, and the handle 180 can be accommodated in the containing slot 1224*b*.

Particularly, when packing and storing the spray fan 100, pour out the water in the box 110 to ensure that the inside of the box 110 is dry. Then, the fan body 130 is inverted so that the fan body 130 is embedded in the box 110, and the base 122 is fastened with the edge of the box 110, and it is fixed on the box 110 by the clamping assembly 112. At this time, the second shell 1224 is exposed, and by turning the handle 180 arranged on the second shell 1224, it is convenient for the user to carry the spray fan 100 in the storage state. In addition, the second shell 1224 is also provided with a containing slot 1224*b*, which is convenient to hide the handle 180 in the containing slot 1224*b* to avoid exposure during storage.

Figure 8:
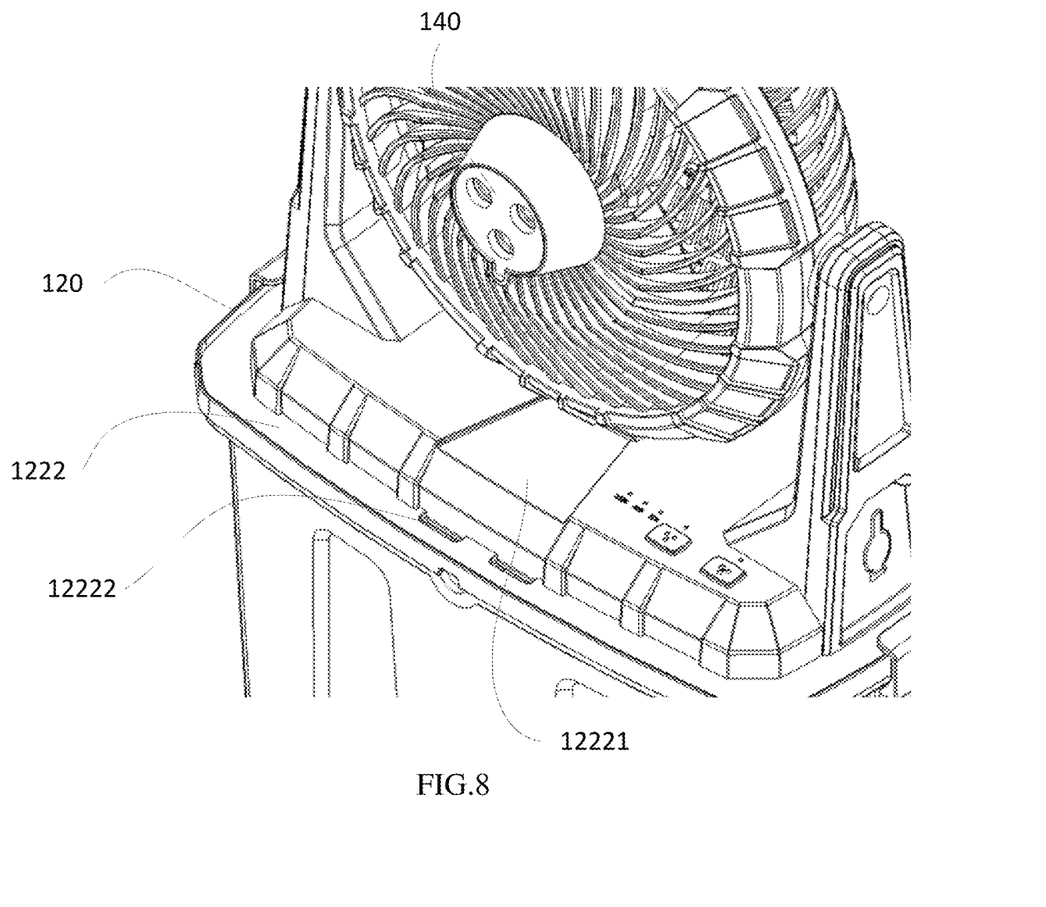
Figure 9:
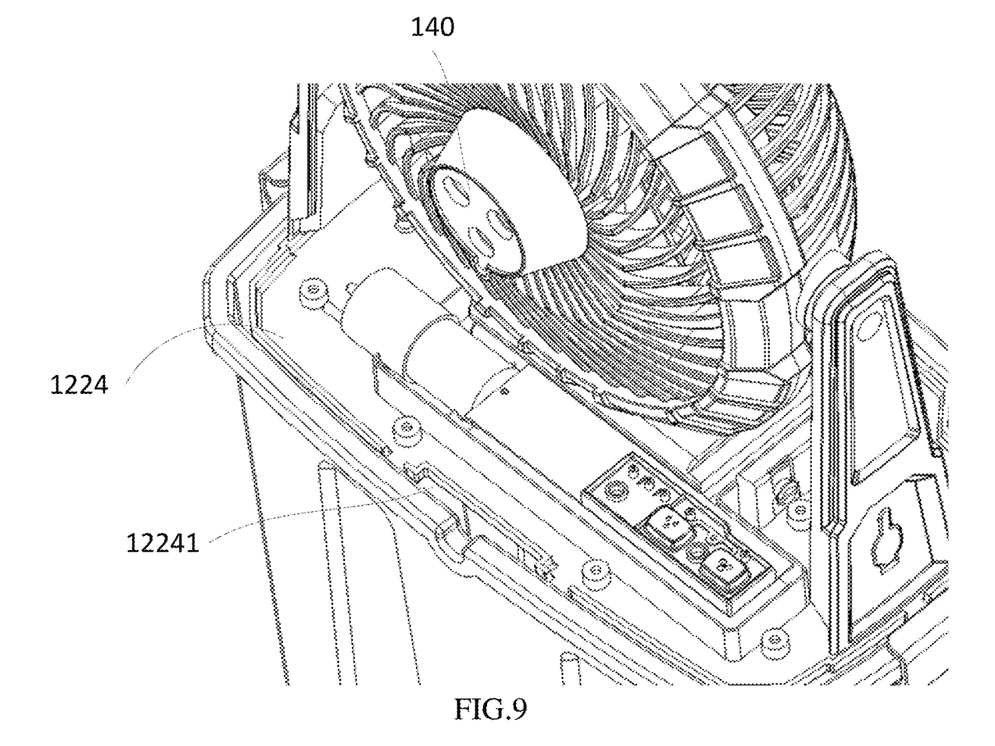

As shown in FIGS. 8 and 9, the mounting base 120 includes a water guide channel 12221 arranged below the spray assembly 140, and a water guide hole provided on the mounting base 120 and communicating with the water guide channel 12221. The water guide hole includes a first water guide hole 12222 specifically provided on the first shell 1222, and a second water guide hole 12241 provided on the second shell 1224. The first water guide hole 12222 communicates with the second water guide hole 12241 and is also connected to the box 110.

Liquid leaking from the spray assembly 140 accumulates and falls into the water guide channel 12221, is directed through the water guide channel 12221 to the first water guide hole 12222, and then passes through the second water guide hole 12241 to drop back into the box 110.

Figure 10:
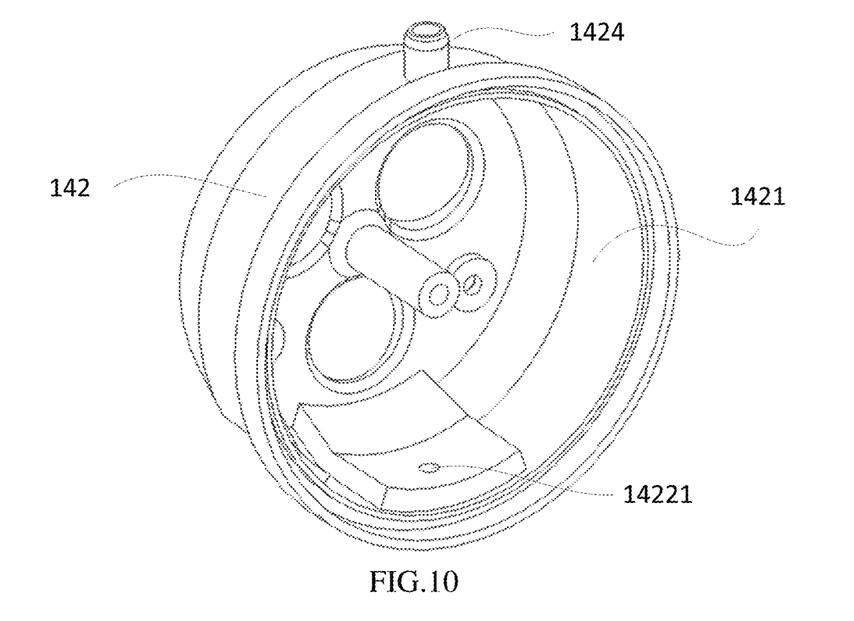
Figure 11:
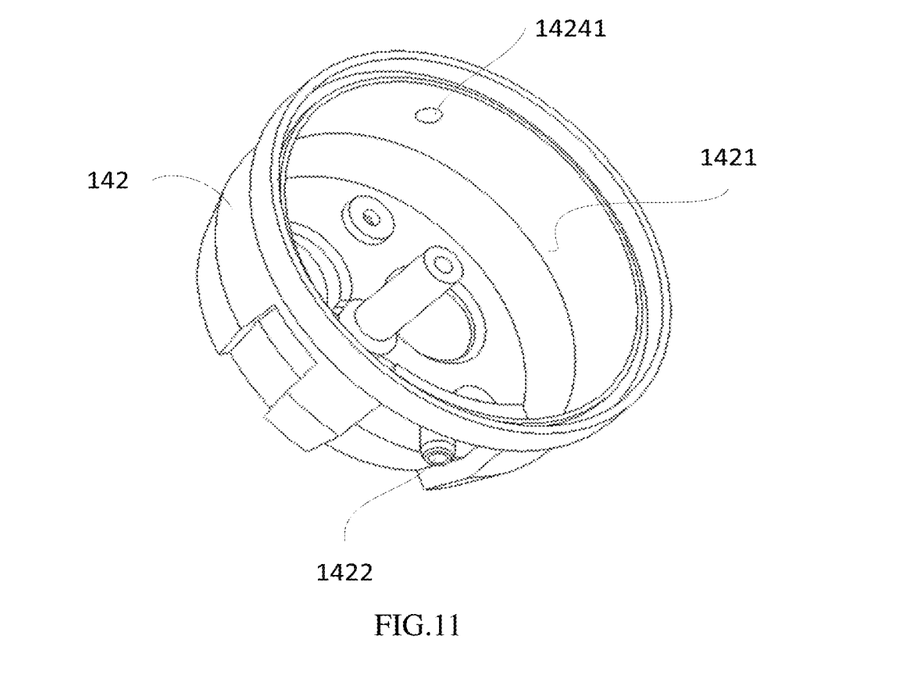
Figure 12:
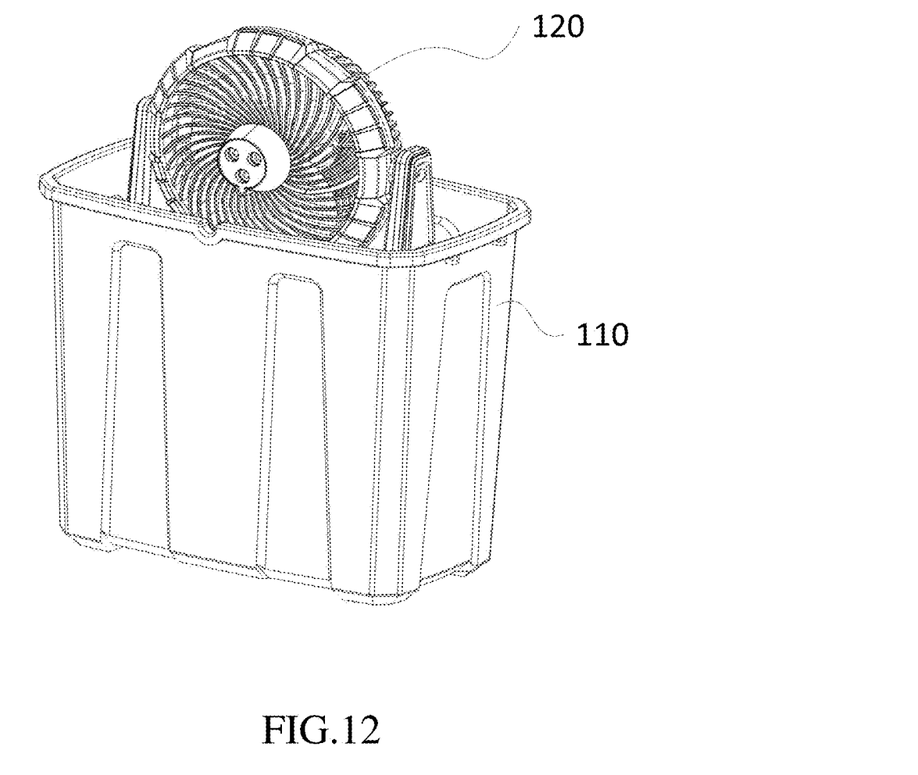
Figure 13:
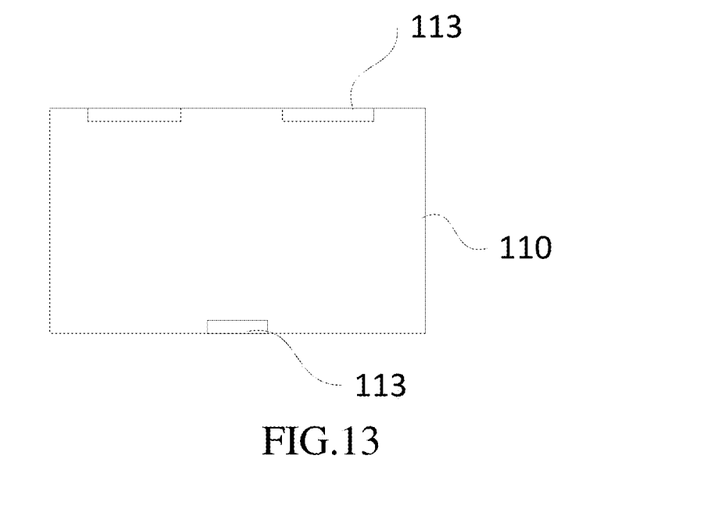
Figure 14:
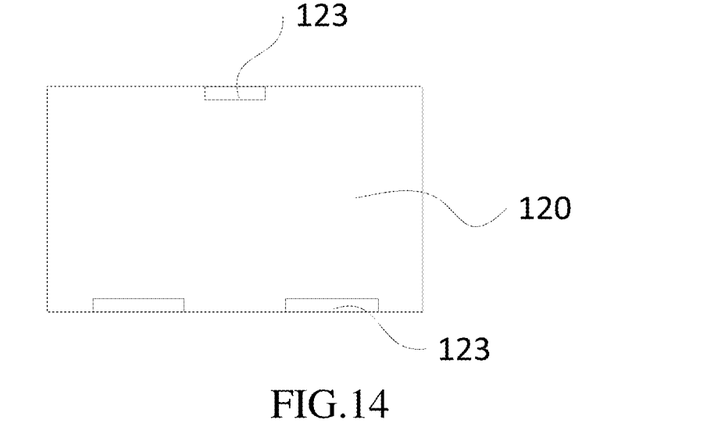

As shown in FIGS. 10 and 11, a water inlet 1422 is provided at the lower end of the water storage bin 142, and an overflow port 1424 is provided at the upper end of the water storage bin 142. A water storage chamber 1421 is provided inside the water storage bin 142. The water storage chamber 1421 communicates with the water inlet 1422 through a water inlet hole 14421 and communicates with the overflow port 1424 through an overflow hole 14241.

The circuit board 172 is provided with a timing function. The circuit board 172 controls the activation of the pump 152 at timed intervals and shuts off the pump 152 within a preset time after activation. The purpose is to inject liquid from the water inlet 1422 into the water storage chamber 1421 via the pump 152 and fill the water storage chamber 1421 to facilitate better atomization. Excess liquid overflows from the overflow port 1424. Therefore, it is necessary to shut off the pump 152 within the preset time after activation to prevent excessive overflow and energy consumption.

It should be understood that the above embodiments are only used to illustrate the technical solution of the present disclosure, and not to restrict it. For a person skilled in the art, the technical solution recorded in the above embodiments may be modified or some of the technical features may be equivalent replaced. All such modifications and substitutions shall fall within the scope of the claims disclosed in the present application.

What is claimed is:

1. A spray fan, comprising a box, a mounting base and a fan body,
   wherein the fan body is arranged on the mounting base, the fan body is provided with a spray assembly, the spray assembly is located on an air outlet side of the fan body,
   the mounting base is also provided with a pumping component connected to the spray assembly to supply water to the spray assembly;
   the pumping component comprises a pump arranged in the mounting base, and a suction pipe and a drainpipe respectively connected to the pump;
   the spray assembly comprises a water storage bin arranged on the fan body, and at least one ultrasonic atomizer arranged on the water storage bin;
   the water storage bin is provided with a water inlet and an overflow port, the water inlet is connected to the drainpipe, and the overflow port is provided with an overflow pipe connected to a drainage hole of the mounting base; and
   the box and the mounting base are detachably arranged so that the fan body has a first state arranged on the box and a second state stored in the box.

2. The spray fan according to claim 1, wherein opposite sides of the mounting base is respectively fastened with the box, the opposite sides of the box are provided with clamping assemblies, and the box and the mounting base are clamped and limited through the clamping assemblies.

3. The spray fan according to claim 2, wherein the mounting base comprising a base and support arms arranged on the base, the fan body is rotationally connected to the support arms with a damping effect, the mounting base is fastened with the box through the base.

4. The spray fan according to claim 3, wherein each clamping assembly comprising a rotating part, a connecting part and a holding part connected in sequence, the rotating part, the connecting part and the holding part form a U-shaped structure, the rotating part is rotationally connected to the box, the holding part is provided with a buckle, the buckle is configured to be held with the base.

5. The spray fan according to claim 4, wherein the base comprising a first shell and a second shell connected to each other, the first shell comprises a support panel and a flange arranged on an edge of the support panel, a T-shaped structure is formed between the flange and the support panel, and the buckle is inserted into the flange, the second shell and each support arm are respectively connected to the support panel, and the second shell is located on a side of the support panel deviating from the support arms.

6. The spray fan according to claim 5, wherein the first shell and/or the second shell are provided with a wiring via hole, so that the suction pipe inserts into the box through the wiring via hole, the drainpipe is connected to the spray assembly.

7. The spray fan according to claim 6, wherein each support arm comprising a first vertical plate arranged on the first shell and a second vertical plate connected to the first vertical plate, between which a wiring channel is formed, so that the drainpipe is connected to the spray assembly along the wiring channel of one of the support arms.

8. The spray fan according to claim 7, wherein the base is also provided with a battery, the pump, the spray assembly and the fan body are electrically connected to the battery, the base is further provided with a control switch, the control switch is electrically connected to the pump, the fan body, the spray assembly and the battery through a circuit board respectively, and is used to control start and stop of the pump and the fan body, wherein the spray assembly and the pump are connected in series.

9. The spray fan according to claim 1, wherein the water storage bin is provided with an absorbent cotton corresponding to the ultrasonic atomizer.

10. The spray fan according to claim 1, wherein the water inlet is located at a lower end of the water storage bin, and the overflow port is located at an upper end of the water storage bin.

11. The spray fan according to claim 7, wherein the water inlet is located at a lower end of the water storage bin, and the overflow port is located at an upper end of the water storage bin, and the overflow pipe is connected to a drain hole on the second shell through the support arm.

12. The spray fan according to claim 5, wherein a handle is rotationally arranged on the second shell, a containing slot is arranged on the second shell, and the handle is accommodated in the containing slot.

13. The spray fan according to claim 5, wherein a handle is rotationally arranged on a bottom of the mounting base, a containing slot is arranged on the second shell, and the handle is accommodated in the containing slot.

14. The spray fan according to claim 1, wherein a handle is rotationally arranged on a bottom of the mounting base.

15. The spray fan according to claim 1, wherein the fan is stored in an inverted position inside the box in the second state.

16. The spray fan according to claim 1, wherein the fan is stored in a lowered position inside the box in the second state.

17. The spray fan according to claim 1, wherein the mounting base comprises a water guide channel arranged below the spray assembly, and a water guide hole provided on the mounting base and communicating with the water guide channel.

18. The spray fan according to claim 10, wherein the overflow pipe is arranged to extend inclined upward.

19. The spray fan according to claim 1, wherein the water inlet is provided on one side of the water storage bin, and the overflow port is provided on an other side of the water storage bin.

* * * * *